United States Patent

[15] 3,661,229

Stonhaus [45] May 9, 1972

[54] LEVELING DEVICE

[72] Inventor: James H. Stonhaus, 919 E. Holland, Fresno, Calif. 93704

[22] Filed: Nov. 9, 1970

[21] Appl. No.: 87,917

[52] U.S. Cl. ............................................................. 188/32
[51] Int. Cl. ........................................................ B60t 3/00
[58] Field of Search .............. 105/369 C; 188/32; 248/119 R; 280/179 R

[56] References Cited

UNITED STATES PATENTS 2,413,744 1/1947 Carter ............................... 188/32 UX
2,954,101 9/1960 Corson ................................... 188/32

*Primary Examiner*—Duane A. Reger
*Attorney*—Huebner & Worrel

[57] ABSTRACT

A leveling device adapted to be placed beneath the wheels of a camper trailer or the like providing a tapered supporting block having an upper, inclined, wheel supporting ramp surface and a tapered wheel positioning block adjustably mounted on said supporting block having an upper surface oppositely inclined from said ramp surface of the supporting block in angularly facing cradling relation to the wheel of the trailer.

9 Claims, 4 Drawing Figures

PATENTED MAY 9 1972  3,661,229
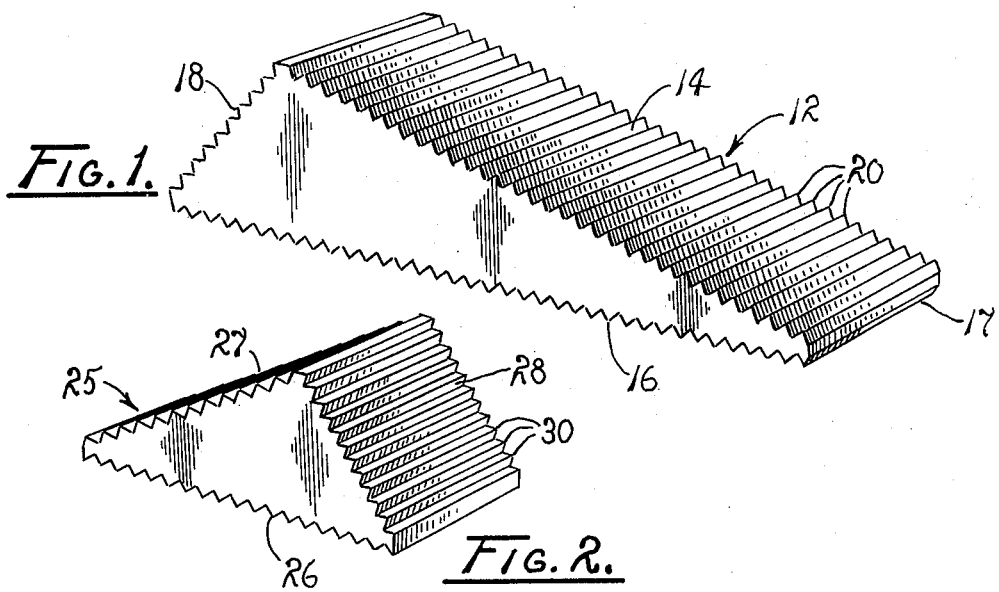
FIG. 1.
FIG. 2.
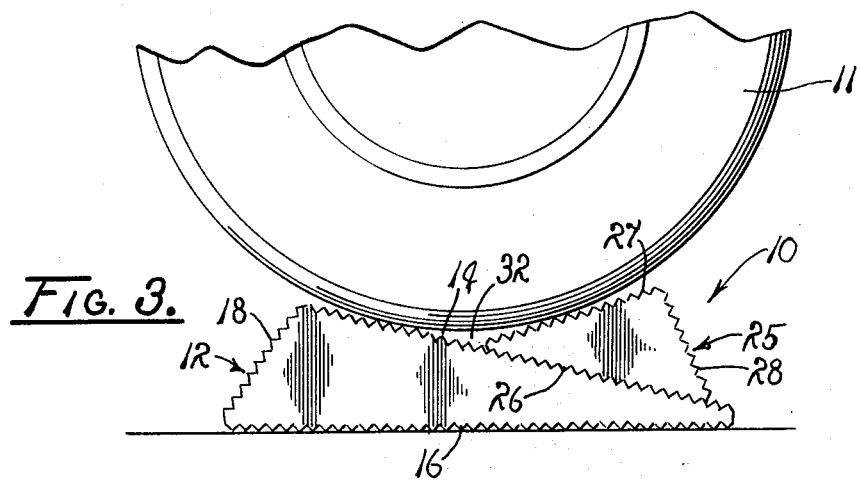
FIG. 3.
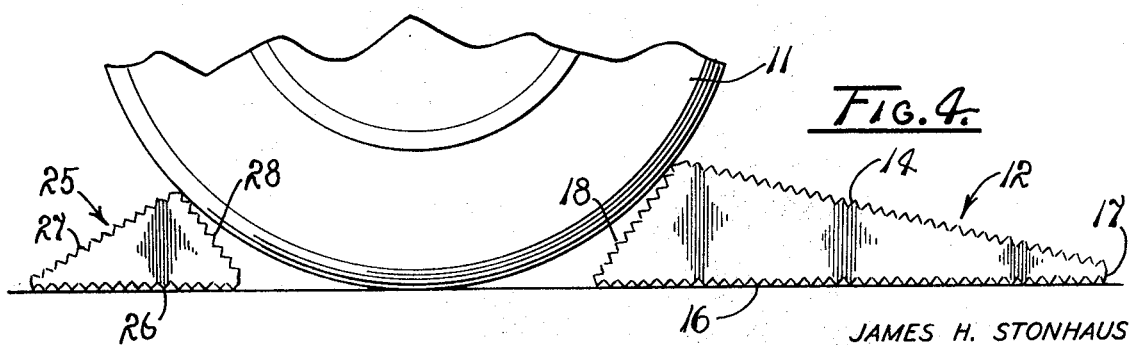
FIG. 4.
JAMES H. STONHAUS
INVENTOR
Huebner & Worrel
ATTORNEYS

LEVELING DEVICE

BACKGROUND OF THE INVENTION

Mobile homes, camper trucks, trailers and the like are frequently parked on irregular or sloping terrain, causing one side thereof to be higher or lower than the other side. In order fully to enjoy the comforts provided by such mobile shelters, it is desirable that they be maintained in a substantially level condition when parked for use. In some instances, this is necessary for proper operation of the usual camping appliances such as gas stoves, refrigerators, lanterns, and the like, and for the general comfort and effective use of the facility. In the past, various types of relatively heavy, cumbersome mechanical screw jacks or hydraulic jacks have been employed which require precise placement beneath the body of the trailer or camper. This is usually a difficult and hazardous task to accomplish in view of the relatively inaccessible restricted area beneath the body and, after placement, are difficult conveniently to manipulate during the leveling operation. Furthermore, such jacks are not usually sufficiently stable for supporting the camper or trailer body for any extended period particularly if substantial traffic is experienced in and out of the camper requiring frequent readjustments of the jacks. Even when successfully employed, such jacks further require the use of some type of chocks on each side of the wheels in wedging relation thereto in order to prevent inadvertent rolling movement and slipping of the camper trailer off of the leveling jacks.

SUMMARY OF THE INVENTION

Accordingly, it is an object of the present invention to provide an improved leveling device for camper trailers and the like.

Another object is to provide such an improved leveling device which serves the dual function of leveling and precluding inadvertent rolling movement of the camper trailer.

Another object is to provide a leveling device of the character described which may be more easily and conveniently utilized than conventional leveling devices.

Another object is to provide an improved leveling device which is lightweight, durable, easily transported, and readily adjustable to a wide variety of elevationally supporting positions.

Another object is to provide an improved leveling device which is easily and conveniently installed and removed without special tools.

Another object is to provide an improved leveling device which is effective dependably to support a camper trailer or the like in a substantially stable elevated position without requiring any additional adjustments after the initial installing operation.

Another object is to provide an improved leveling device which utilizes a pair of tapered blocks conveniently disposable beneath the wheels of a camper trailer or the like for elevating and leveling the same without the use of any type of elevating jack.

Another object is to provide an improved leveling device of the character described in which the tapered leveling blocks afford an adjustable wheel cradling trough for dependably supporting the wheel in an elevated position thereon which precludes any inadvertent rolling movement of the wheels relative to the blocks.

Another object is to provide an improved leveling device in which the tapered blocks are readily adapted to be separated and individually utilized as chocks on opposite sides of a wheel when the camper trailer is disposed on relatively level ground.

Other objects and advantages of the present invention will subsequently become more clearly apparent upon reference to the following description and accompanying drawing.

BRIEF DESCRIPTION OF THE DRAWING

FIG. 1 is a perspective of the lower ground engaging wheel supporting block embodying the principles of the present invention.

FIG. 2 is a perspective of an upper wheel positioning block removed from the lower supporting block of FIG. 1.

FIG. 3 is a side elevation of the upper and lower blocks disposed in assembled, operating, wheel-elevating position.

FIG. 4 is a side elevation showing the upper and lower blocks separated and inverted for use as chocks on opposite sides of the wheel.

DESCRIPTION OF THE PREFERRED EMBODIMENT

Referring more particularly to the drawing, a leveling device embodying the principles of the present invention is generally indicated by the reference numeral 10 for use in elevating the wheel 11 of a camper trailer or the like, not shown, for precisely leveling the same when required to be parked on irregular or sloping terrain. The leveling device provides an elongated, tapered supporting block 12 having an upper wheel supporting ramp surface 14. The block is preferably constructed of a substantially solid, lightweight, durable plastic, wood or metallic material adapted easily to support the weight of any existing camper trailer or the like. The block is substantially triangular, having a lower ground engaging surface 16 disposed in diverging relation to the upper ramp surface from a relatively thin nose or forward edge 17 with the lower surface being somewhat longer than the upper ramp surface. A rearwardly disposed relatively steeply inclined surface 18 is extended between the upper and lower surfaces of the block which, as best shown in FIG. 4, may be utilized for wheel engagement when the block is employed as a simple chock. A plurality of serrations 20 are formed on each of the above described surfaces of the block transversely of the tapered length thereof. The serrations form a substantially skid-proof surface for minimizing relative sliding movement between the block and any object engaged thereby.

A somewhat similar triangularly shaped tapered wheel positioning block 25 is adapted to be utilized in connection with the supporting block 12 in order precisely to elevate the wheel 11 within a predetermined range, depending upon the size of the lower supporting block 12. The wheel positioning block is constructed of substantially the same material as the lower supporting block and is preferably approximately one-half the size of the lower supporting block although such proportions are not essential to the proper operation of the present invention. It is desirable, however, that the wheel positioning block be somewhat smaller than the lower supporting block in order to accommodate some range of desired relative adjusting movement therebetween. The wheel positioning block provides a lower surface 26, an opposite upper wheel-engaging surface 27, and a rearward, relatively steeply inclined surface 28.

A plurality of serrations 30 of precisely the same configuration as the serrations 20 on the surfaces of the lower supporting block 12 are formed on each of the three surfaces of the wheel positioning block 25. The lower serrated surface 26 of the wheel positioning block is adapted to be received upon the upper ramp surface 14 of the lower supporting block, as shown in FIG. 3, with their respective serrations precisely interfitting in order to preclude any relative longitudinal sliding movement between the blocks. Accordingly, the mating serrations provide a dependable locking mechanism upon assembly of the blocks along any of their described serrated surfaces and in a variety of longitudinally shifted positions relative to each other.

When the upper wheel positioning block 25 is disposed upon the upper ramp surface 14 of the lower supporting block 12, as shown in FIG. 3, the upper surface 27 of the positioning block and the upper ramp surface 14 of the supporting block are arranged in obtusely angular facing relation to form therebetween a wheel cradling trough 32. The dimension of the trough can be easily and conveniently adjusted for different sizes of wheels and for positioning the wheel in a wide variety of different elevational positions by longitudinally shifting the position of the upper block 25 upon the lower supporting block 12.

OPERATION

The operation of the described embodiment of the subject invention is believed to be clearly apparent and is briefly summarized at this point. When it is desired to elevate the wheel 11 in order precisely to level the camper trailer or other vehicle body supported thereby, the upper wheel positioning block 25 is removed from the lower supporting block for positioning the latter on the ground ahead of the wheel in longitudinally aligned relation therewith. The nose 17 of the lower supporting block is disposed adjacent to the leading periphery of the wheel and the vehicle is moved forwardly in order to roll the wheel upwardly upon the upper ramp surface 14 of the lower supporting block. The upper wheel positioning block 25 is then disposed upon the upper ramp surface 14 of the supporting block 12, as shown in FIG. 3, behind the lower rearward periphery of the wheel 11 to preclude rearward rolling movement of the wheel downwardly along the upper ramp surface of the supporting block. The wheel cradling trough 32 formed between the upper surfaces 27 and 14 of the upper and lower blocks is effective dependably to constrain the wheel by the locking engagement of the mating serrations 30 and 20 of the blocks in any desired elevation relative to the ground depending upon the range of adjustment provided by the height of the lower supporting block 12. Such elevational height of the wheel is easily and conveniently adjusted upon relieving the weight of the wheel from the upper block by longitudinally shifting the upper wheel positioning block upwardly or downwardly along the upper ramp surface 14.

Alternatively, the supporting block 12 and the positioning block 25 can be separated and individually utilized as simple chock blocks when the wheel 11 is disposed on relatively level ground. As best shown in FIG. 4, the blocks are separated and inverted relative to each other and placed on opposite sides of the wheel 11 with their rearward surfaces 18 and 28 wedged against the adjacent peripheries of the wheel.

In view of the foregoing, it is readily apparent that the structure of the present invention provides an improved leveling device for camper trailers and the like which permits precise leveling thereof in a relatively fast, convenient manner with a minimum of effort. The serrated, tapered blocks of the present invention are adapted readily to receive and to elevate the wheels of such camper trailers and the like without any additional jacking operations and dependably to constrain the wheels in their desired elevated positions while providing a substantially stable base for the trailer.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A leveling device, adapted to be placed beneath the wheels of a camper trailer or the like, comprising a tapered supporting block having an inclined upper wheel supporting ramp surface; and a tapered wheel positioning block adjustably mountable on said supporting block providing an upper surface oppositely inclined from said ramp surface of said supporting block in angularly facing cradling relation to the wheel of the trailer.

2. The leveling device of claim 1 including means releasably locking said positioning block on said supporting block to preclude relative sliding movement therebetween for maintaining their upper surfaces in said angularly facing cradling relation to the wheel.

3. The leveling device of claim 2 in which said blocks are of a generally triangular configuration.

4. The leveling device of claim 3 in which each of said blocks has a lower base surface somewhat longer than said upper surface thereof at one end of the block and converging therewith to form a relatively thin edge, and an opposite end providing a relatively steeply inclined surface interconnecting said upper and lower surfaces.

5. The leveling device of claim 4 in which said locking means includes a plurality of serrations on said upper ramp surface of the supporting block, and a plurality of substantially similar serrations on the lower base surface of said positioning block which are adapted to intermesh and permit locking assembly of the positioning block in a wide variety of wheel cradling positions upwardly and downwardly along said upper ramp surface of the supporting block.

6. The leveling device of claim 5 including a plurality of serrations formed on the other of said upper, lower and end surfaces of said blocks to permit locking engagement between the blocks in any desired indexed relation.

7. The leveling device of claim 6 in which said serrations are formed transversely of the taper of the blocks.

8. The leveling device of claim 7 in which the blocks are separable for disposing their respective steeply inclined surfaces individually against opposite sides of the wheel on relatively level terrain.

9. The leveling device of claim 8 in which said supporting block is approximately twice as long as the positioning block.

* * * * *